(12) United States Patent
Clough et al.

(10) Patent No.: US 6,912,374 B2
(45) Date of Patent: Jun. 28, 2005

(54) SECURE REFERENCE PRINTING USING PERSONAL ELECTRONIC DEVICES

(75) Inventors: James Clough, Meridian, ID (US); Darrel Cherry, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 576 days.

(21) Appl. No.: 09/957,233

(22) Filed: Sep. 19, 2001

(65) Prior Publication Data

US 2003/0054766 A1 Mar. 20, 2003

(51) Int. Cl.⁷ .................................................. H04B 7/00
(52) U.S. Cl. ...................... 455/41.2; 455/41.3; 455/557
(58) Field of Search .............................. 455/41.1, 41.2, 455/41.3, 557, 410; 713/155, 165, 176, 200; 380/255, 282

(56) References Cited

U.S. PATENT DOCUMENTS

| | | | | |
|---|---|---|---|---|
| 6,378,070 B1 | * | 4/2002 | Chan et al. | 713/155 |
| 6,751,732 B2 | * | 6/2004 | Strobel et al. | 713/176 |
| 2001/0018330 A1 | | 8/2001 | Yamauchi | |

FOREIGN PATENT DOCUMENTS

| | | |
|---|---|---|
| EP | 0935182 | 8/1999 |
| GB | 2350713 | 12/2000 |
| WO | WO03/007159 | 1/2003 |

* cited by examiner

Primary Examiner—Melur Ramakrishnaiah

(57) ABSTRACT

Improved methods and apparatuses are provided that allow personal electronic devices to direct/control the selection/printing of data files from a remote server device using a local printing device in a secure manner.

20 Claims, 2 Drawing Sheets

SECURE REFERENCE PRINTING USING PERSONAL ELECTRONIC DEVICES

TECHNICAL FIELD

The present invention relates generally to computers, networks and printers, and more particularly to methods and apparatuses for providing secure reference printing using personal electronic devices.

BACKGROUND

Mobile users having personal electronic devices, such as, for example, personal digital assistants (PDAs), mobile communication devices, and the like, do not always have the ability to store certain data files within these devices that the user may want to print while away from their regular office's computing environment. For example, a salesperson may need to print out a document stored on a content server located at the main office or another office, in preparation for a planned visit with an existing or potential customer. Let us assume that the salesperson, in this example, has access to a hotel business computing center having at least one computer and a printer that are connected to the Internet. Here, the salesperson would typically need to gain access to the content server and the data file stored thereon through the Internet using the hotel's computer. Once the desired data file has been located, it would typically be downloaded to the hotel's computer and then subsequently printed using the hotel's printer. This may require that the hotel's computer have certain application software as required to read and print a given data file. For example, a spreadsheet data file may require its associated spreadsheet program and a word-processed data file may require its associated word processing program in order to be accessed and printed.

While this remote accessing and printing procedure may work for certain users and/or data files, the attendant lack of security with regard to the information relayed back and forth between the hotel's computer and the content server may reduce the overall usefulness of the remote login/browsing process. Notice that, in the example given above, the hotel's computer could be configured to record and/or otherwise pass-on the necessary information to gain access to the content server or other resources. This information could then be used at a later time to access the content server, etc.

One way to reduce this potential security risk, would be to first access the content server and download the desired data file to the salesperson's personal electronic device over a separate secure communication link. Unfortunately, not all personal electronic devices are able to store and/or otherwise support such data files.

Thus, there is a need for improved methods and apparatuses that allow personal electronic devices to direct and control the selection and printing of data files in a more secure manner.

SUMMARY

In accordance with certain aspects of the present invention, improved methods and apparatuses are provided that allow personal electronic devices to direct and control the selection and printing of remotely located data files in a secure manner.

Thus, for example, in accordance with certain implementations of the present invention, a method is provided that includes establishing a first communication channel between a first device and a printing device, and establishing a second communication channel between the printing device and a second device. Here, the second communication channel is secure communication channel. The second device has access to at least one printable data file. The method then includes causing the second device to send an at least partially encrypted message to the first device through the second communication channel, the printing device and the first communication channel. The message includes a unique identifier. The method further includes causing the first device to send request message to the second device through the first communication channel, the printing device and the second communication channel. Here, the request message includes the unique identifier and requests that printable data associated with the at least one printable data file be sent to the printing device for printing.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
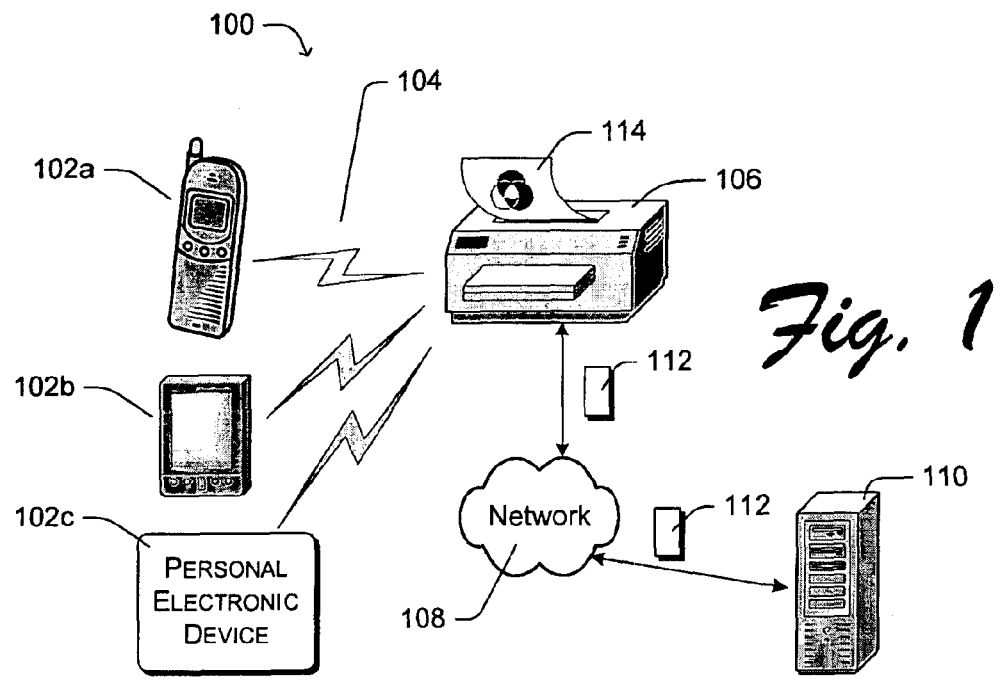
FIG. 1 is a block diagram depicting a networked environment having a personal electronic device arranged to selectively and securely control the local printing of a data file available on a remote server, in accordance with certain exemplary implementations of the present invention.

FIG. 1 is a block diagram depicting an exemplary networked environment 100 that is operatively supportive of various personal electronic devices 102 that are configured to communicate over a wired or wireless communication link, represented here by a wireless link 104, to a co-located printing device 106. Printing device 106 is further configured to connect through at least one communication link or network 108 to a remotely located server device 110.

In this example, three representative personal electronic devices 102a–c are shown. Personal electronic device 102a represents a mobile telephone or like communication device. Personal electronic device 102b represents a personal digital assistant (PDA) or like computing device. Personal electronic device 102c is a generic representation of any other suitable type of personal electronic device that is configured to communcate with printing device 106, preferably over wireless communication link 104. In certain implementations, wireless communication link 104 is representative of an infrared-based communication process, or a radio frequency (RF)-based communication process.

In this example, printing device 106 is illustratively represented by a laser printer. It should, however, be understood that printing device 106 may take the form of other printing devices, such as, for example, an ink jet printer, a copier device, a facsimile device, etc.

Network 108 is representative of one or more communication links, and may include, for example, the Internet and/or other like networks that are configured to support access to server device 110.

Server device 110 is representative of any computing resources capable of selectively providing a printable data file 112 to printing device 106 through network 108. For example, in certain implementations, server device 106 includes one or more computing resources that are configured to operate as a content server. As further illustrated, printing device 106 is configured to produce a printout 114 based on printable data file 112.

To reduce the chances of an unauthorized party gaining access to the server device 110, for example, by later impersonating the user of a personal electronic device 102*a–c*, networked environment 100 is configured to allow secure communications between one of the personal electronic devices 102*a–c* and server device 110, via printing device 106 and network 108. As such, the user of the personal electronic device 102*a–c* may, for example, log-on to server device 110 and selectively browse through or otherwise access, available printable data files, in a secure manner such that printing device 106 (or another device) cannot at a later time mimic the personal electronic device and/or otherwise access server device 110.

Figure 2:
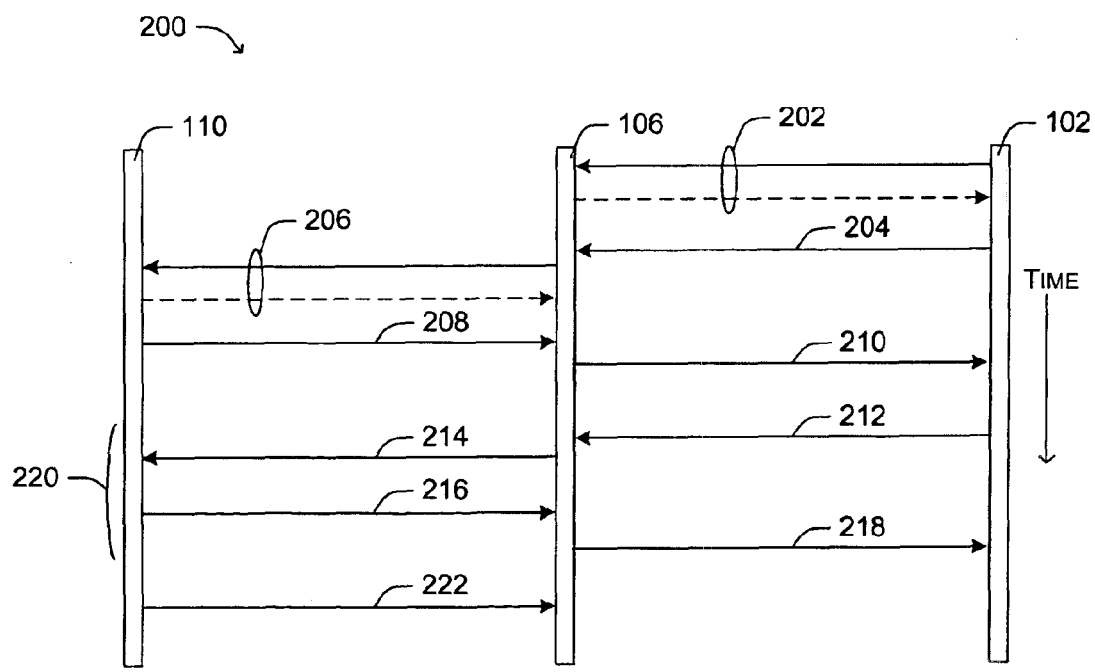
FIG. 2 is an illustrative information flow diagram depicting a secure data file selection and printing session that can be conducted through a networked environment, for example, as in FIG. 1, in accordance with certain exemplary implementations of the present invention.

With this in mind, attention is now drawn to the illustrative information flow diagram 200 depicted in FIG. 2. Here, an exemplary communication session is illustrated by various data and/or procedure calls (e.g., messages) passed between a personal electronic device 102, printing device 106 and server device 110. Note that the timing of the information flow is illustrated as flowing from top to bottom.

A first exchange, represented by arrows 202, is made between personal electronic device 102 and printing device 106. The purpose of this first exchange is to establish a communication channel, in this example, a secure channel, between the two devices over wireless communication link 104. While it is preferred that this communication channel be a secure channel, it is not necessary.

In this exemplary implementation the first exchange, which does creates a secure channel, includes a shared key exchange, such as, e.g., a Diffie-Hellman key exchange. Other exemplary techniques include secure sockets layer (SSL) and secure hypertext transfer protocol (HTTP). Those skilled in the art will recognize that other similar secure communication techniques may be implemented.

In the next communication, represented by arrow 204, personal electronic device 102 identifies server 110 to printing device 106, over the resulting secure channel, for example, by passing a corresponding uniform resource locator (URL), Internet Protocol (IP) address, etc. This communication and all subsequent communications over the resulting secure channel will be encrypted or otherwise secured in a manner as applicable to the secure communication technique used to establish the secure channel.

With server device 110 having been identified to printing device 106, printing device 106 is now ready to establish an additional secure channel to server device 110 through network 108. Hence, a further exchange is conducted between printing device 106 and server device 110, as represented by arrows 206. Here, for example, a Diffie-Hellman key exchange, SSL, secure HTTP, or other suitable secure communication technique may be employed.

Once the secure channel between printing device 106 and server device 110 is established, server device 110 will send a message, represented by arrow 208, to printing device 106. All or part of this message is encrypted using a public key associated with a private key maintained in personal electronic device 102. This "once-encrypted" message includes a globally unique identifier that is being provided by server device 110 to personal electronic device 102. In certain implementations, the globally unique is not encrypted.

Note that this once-encrypted message will be further encrypted when passed over the secure channel between server device 110 and printing device 106. As such, printing device 106 receives a "twice-encrypted" message, which it decrypts to reproduce the once-encrypted message. Printing device 106 then further encrypt the once-encrypted message as required by the secure channel between printing device 106 and personal electronic device 102. The communication of this now twice-encrypted message from printing device 106 to personal electronic device 102 is represented by arrow 210. Upon receipt of this twice-encrypted message, personal electronic device 102 first decrypts it in accordance with the secure channel and then further decrypts the resulting reproduced once-encrypted message using the private key maintained by personal electronic device 102. This second decrypting process reproduces the original message.

When encrypted, a globally unique identifier can be passed from server device 110 to personal electronic device 102, through printing device 106, without allowing printing device 106 to learn it.

Next, using the globally unique identifier that was just received, personal electronic device 102 can begin any requisite login procedures, etc., and begin allowing the user to selectively browse the printable data files available from server device 110. Thus, for example, personal electronic device 102 can send an applicable request message, as represented by arrow 212, to printing device 106. This request message includes the globally unique identifier that was just received. The request message is signed using the private key maintained by personal electronic device 102. Optionally, all or part of the request message may be encrypted using the private key. The resulting once-encrypted request message is then further encrypted as required by the secure channel between personal electronic device 102 and printing device 106.

Consequently, when printing device 106 receives the twice-encrypted request message it will decrypt it to reproduce the once-encrypted request message. Printing device 106 will then further encrypt the once-encrypted request message as required by the secure channel between printing device 106 and server device 110. The communication of this now twice-encrypted request message from printing device 106 to server device 110 is represented by arrow 214. Upon receipt of this twice-encrypted request message, server device 110 first decrypts it in accordance with the secure channel and then further decrypts (or verifies the signature of) the resulting reproduced once-encrypted request message using the public key associated with personal electronic device 102.

The resulting fully decrypted request message will only be honored (e.g., processed and granted) if the globally unique identifier that is received in message (214) matches that previously sent in messages (208, 210).

In this example, it is assumed that the globally unique identifier that is received in message (214) matches that previously sent in messages (208, 210), and that server device 110 processes the request to produce a reply. For example, the reply may include a directory listing that indicates at least a portion of the printable data files available.

The resulting response message, represented by arrows 216 and 218 are handled the same as messages (208, 210)

with regard to the encryption/decryption processes. However, the response message also carries with it a new globally unique identifier that personal electronic device 102 will need to include in the next request message (or other like message). As such, each new message to server device 110 will need to include the most recent globally unique identifier in order to be honored.

The "browsing capability" or "protocol" as represented by the messaging techniques included in sequence 220 can be repeated until the user has identified a desired printable data file. To then print the desired printable data file, a print request message (representable by messages 212 and 214) identifying the data file(s) to be printed is provided from personal electronic device 102 to server device 110 through printing device 106. In response, server device 110 sends corresponding printable data to printing device 106, as represented by arrow 222. Here, unlike the previous data, server device 110 only encrypts the printable data as required by the secure channel between server device 110 and printing device 106. Consequently, printing device 106 is able to fully decrypt the printable data and subsequently print it.

Figure 3:
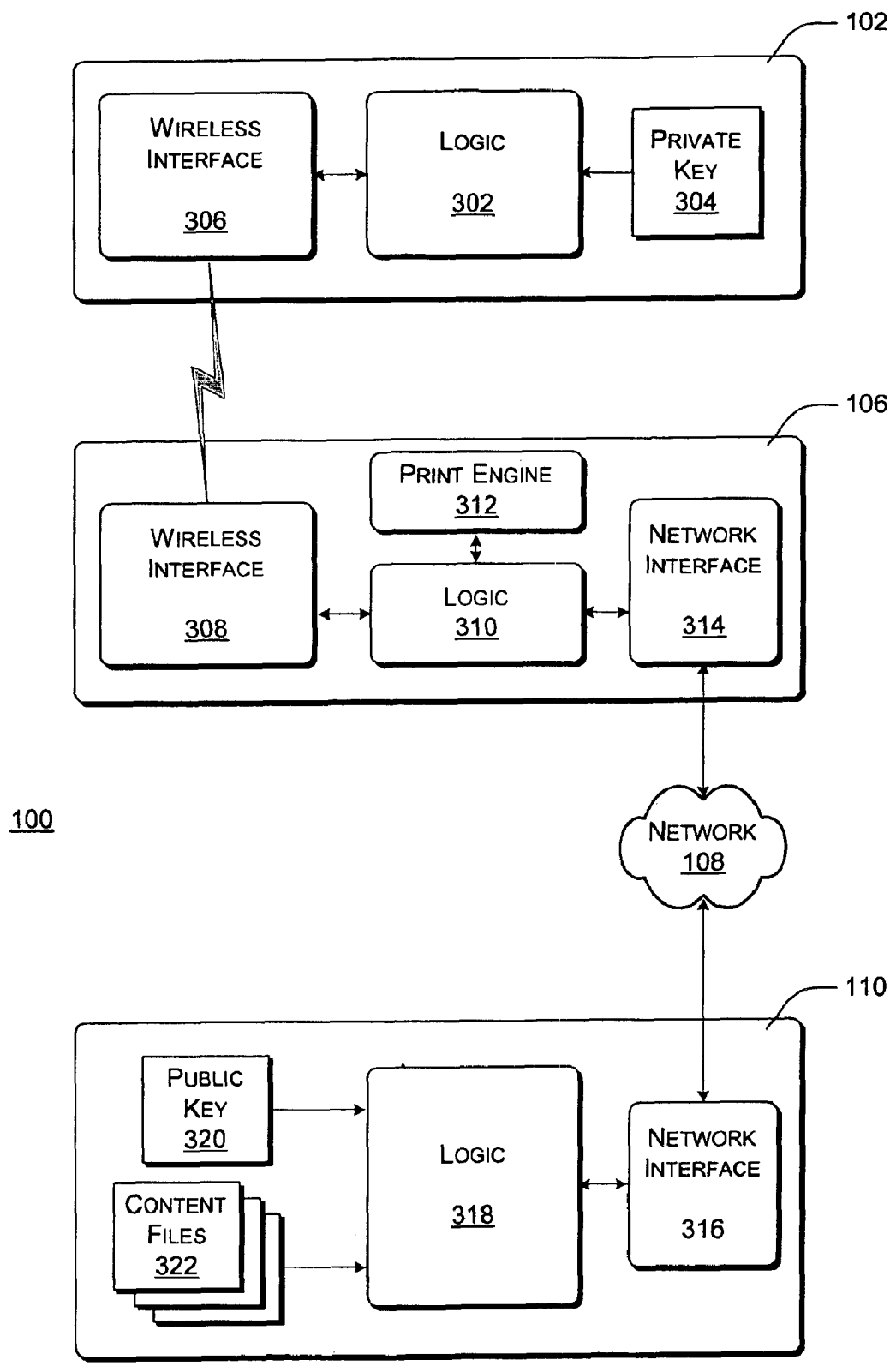
FIG. 3 is a block diagram depicting selected details associated with the networked environment in FIG. 1, in accordance with certain further exemplary implementations of the present invention.

Reference is now made to FIG. 3, which is a block diagram depicting selected details associated with networked environment 100, as in FIG. 1, in accordance with certain further exemplary implementations of the present invention.

As depicted, personal electronic device 102 includes logic 302 that is configured to support the above-described exemplary processes. As illustrated, logic 302 is provided with a private key 304 and operatively coupled to a wireless interface 306.

Printing device 106 includes a wireless interface 308 that is operatively coupled to logic 310. Logic 310 is configured to support the above-described exemplary processes and to provide the printable data to a print engine 312 that is configured to produce a corresponding printout. The printable data may, for example, include PDF, PDL, Postscript, or other similar formatted print data. Logic 310 is further operatively coupled to a network interface 314 that is configured to provide the requisite access to network 108.

Server device 110 includes a network interface 316 that is operatively coupled to logic 318. Logic 318 is configured to support the above-described exemplary processes. Logic 318 is illustrated as having access to a public key 320 associated with personal electronic device 102. Logic 318 is further illustrated as having access to one or more printable data or content files 322, or a mechanism to generate them from native application files. Logic 318 is also configured to generate and/or otherwise have access to globally unique identifiers 324.

As used herein, the term globally unique identifier is meant to represent a string of data that is substantially unlikely to be repeated in the future. For example, in accordance with certain implementations of the present invention, large unique sequence numbers are used such that each one is not repeated for a substantially long time.

Although some preferred implementations of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method comprising:

establishing a first channel between a first device and a printing device;

establishing a second channel between the printing device and a second device, the second device having access to at least one printable data file, and the second channel being a secure channel;

causing the second device to send a message to the first device through the second channel, the printing device and the first channel, the message including a unique identifier;

causing the first device to send a request message to the second device through the first channel, the printing device and the second channel, the request message being at least digitally signed by the first device and including the unique identifier and requesting that printable data associated with the at least one printable data file be sent to the printing device for printing.

2. The method as recited in claim 1, further comprising:

causing the second device to send printable data associated with the at least one printable data file to the printing device for printing in response to the request message.

3. The method as recited in claim 1, wherein causing the first device to send the request message to the second device through the first channel further includes, causing the first device to encrypt at least a portion of the request message.

4. The method as recited in claim 1, wherein causing the first device to send the request message to the second device through the first channel further includes, causing the first device to digitally sign the request message using a private key.

5. The method as recited in claim 1, wherein the first device includes a personal electronic device.

6. The method as recited in claim 5, wherein the personal electronic device is selected from a group of devices comprising a personal digital assistant (PDA) device, a mobile communication device, a computing device, and a communication device.

7. The method as recited in claim 1, wherein the second device includes a server device.

8. The method as recited in claim 1, wherein establishing the first channel between the first device and the printing device includes establishing, a wireless communication link between the first device and the printing device.

9. The method as recited in claim 1, wherein establishing the first channel between the first device and the printing device includes using at least one secure communication technique selected from a group comprising a Diffie-Hellman key exchange technique, a secure sockets layer (SSL) technique, and a secure hypertext transfer protocol (HTTP).

10. The method as recited in claim 1, wherein establishing the second channel between the printing device and the second device includes establishing at least one network communication link between the first device and the printing device.

11. The method as recited in claim 1, wherein establishing the second channel between the printing device and the second device includes using at least one secure communication technique selected from a group comprising a Diffie-Hellman key exchange technique, a secure sockets layer (SSL) technique, and a secure hypertext transfer protocol (HTTP).

12. A system comprising:

a network;

a printing device operatively coupled to the network;

a server device operatively coupled to the network and configurable to access to at least one printable data file and to operatively couple to the printing device through a secure network communication channel through the network;

a device configurable to operatively couple to the printing device through a local communication channel;

wherein the server device is configurable to send a message to the device through the secure network communication channel, the printing device and the local communication channel, the message including a unique identifier; and wherein the device is configurable to send a request message to the server device through the local communication channel, the printing device and the secure network communication channel, the request message being at least digitally signed by the device and including the unique identifier and requesting that printable data associated with the at least one printable data file be sent to the printing device for printing.

13. The system as recited in claim 12, wherein the local communication channel includes a wireless communication channel.

14. The system as recited in claim 12, wherein the request message is at least partially encrypted by the device.

15. The system as recited in claim 12, wherein the request message is digitally signed by the device using a private key.

16. The system as recited in claim 12, wherein the server device is configurable to send the printable data to the printing device for printing in response to the request message.

17. The system as recited in claim 12, wherein the device includes a personal electronic device.

18. The system as recited in claim 17, wherein the personal electronic device is selected from a group of devices comprising a personal digital assistant (PDA) device, a mobile communication device, a computing device, and a communication device.

19. The system as recited in claim 12, wherein the device and the printing device establish the wireless communication channel between using at least one secure communication technique selected from a group comprising a Diffie-Hellman key exchange technique, a secure sockets layer (SSL) technique, and a secure hypertext transfer protocol (HTTP).

20. The system as recited in claim 12, wherein the server device and the printing device establish the secure network communication channel using at least one secure communication technique selected from a group comprising a Diffie-Hellman key exchange technique, a secure sockets layer (SSL) technique, and a secure hypertext transfer protocol (HTTP).

* * * * *

UNITED STATES PATENT AND TRADEMARK OFFICE
CERTIFICATE OF CORRECTION

PATENT NO. : 6,912,374 B2 Page 1 of 1
APPLICATION NO. : 09/957233
DATED : June 28, 2005
INVENTOR(S) : James Clough et al.

It is certified that error appears in the above-identified patent and that said Letters Patent is hereby corrected as shown below:

IN THE CLAIMS

Claim 8, Column 6, line 47, after "establishing" delete ","

Signed and Sealed this

Twenty-sixth Day of June, 2007

JON W. DUDAS
*Director of the United States Patent and Trademark Office*